Dec. 3, 1940.    J. L. JOHNSTON    2,223,913
OIL PRESSURE TESTER
Filed Sept. 4, 1937    3 Sheets-Sheet 1
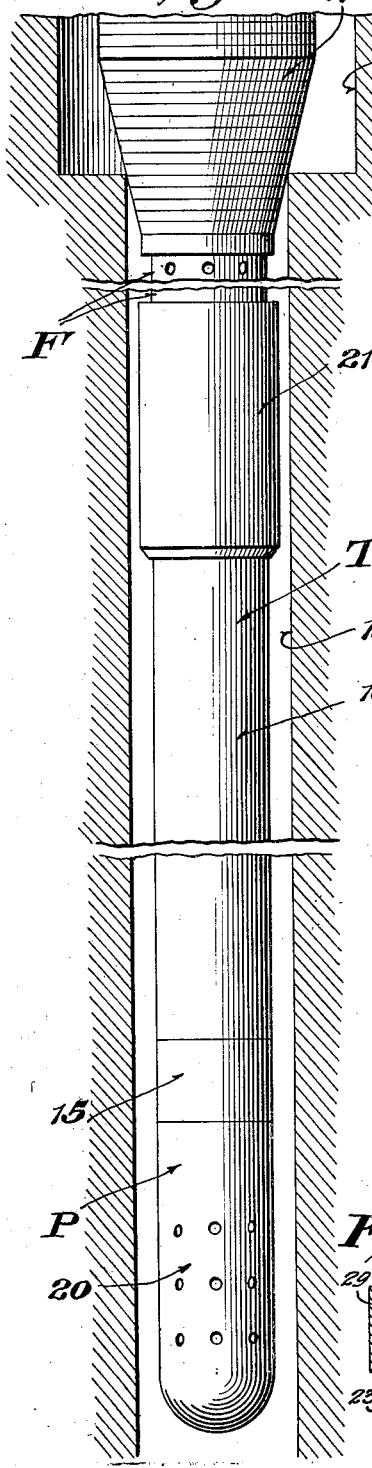
Fig. 1.
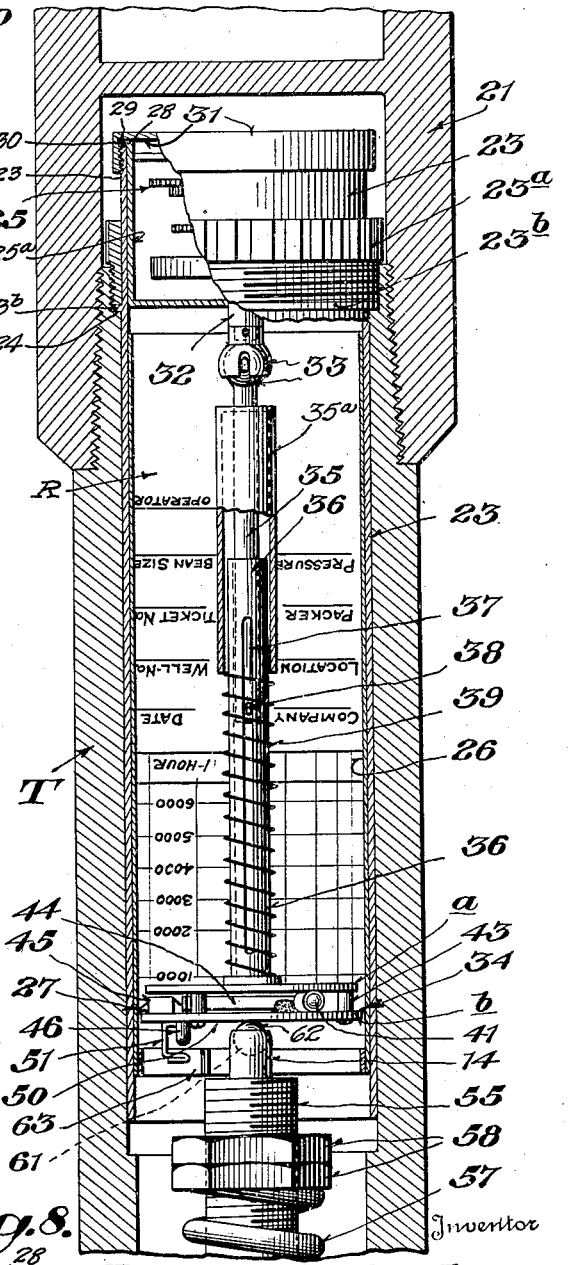
Fig. 3.
Fig. 8.
James L. Johnston,
Inventor
Attorney Dec. 3, 1940.  J. L. JOHNSTON  2,223,913
OIL PRESSURE TESTER
Filed Sept. 4, 1937  3 Sheets-Sheet 2
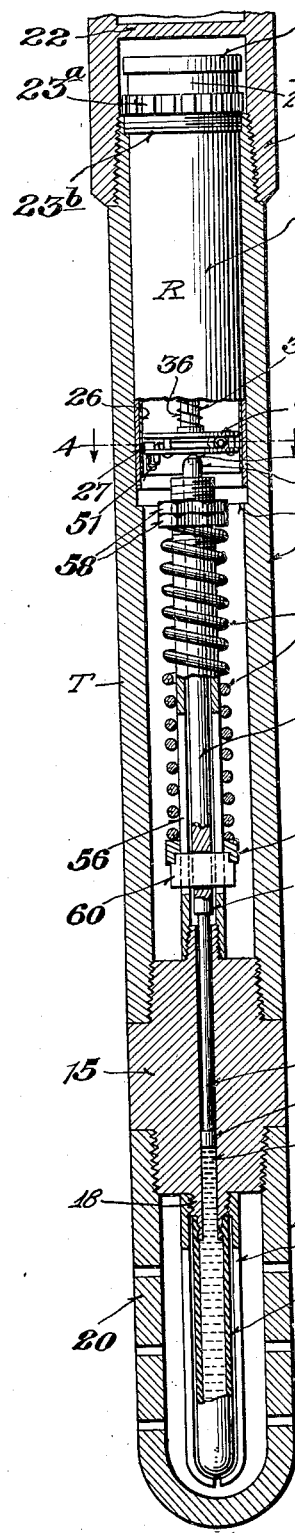
Fig. 2.
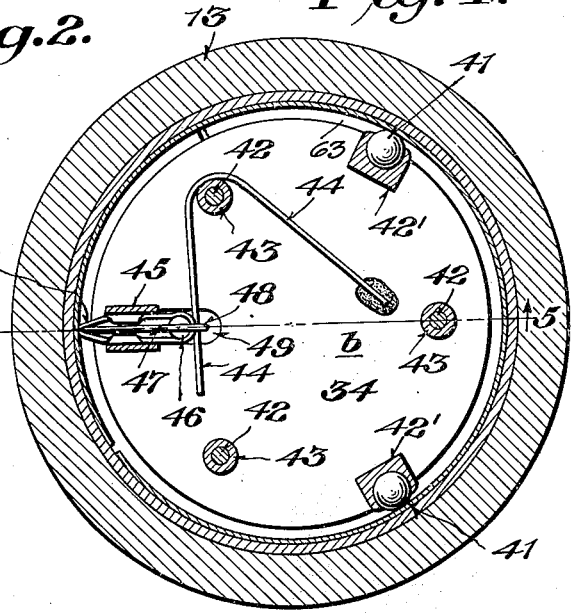
Fig. 4.
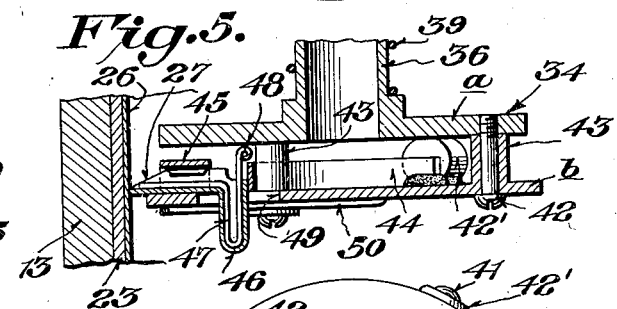
Fig. 5.
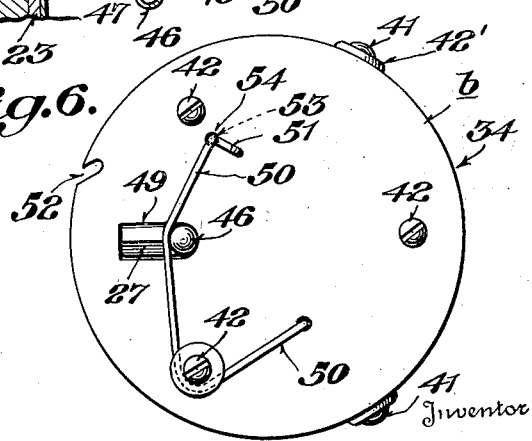
Fig. 6.
Inventor
James L. Johnston,
Attorney Dec. 3, 1940.  J. L. JOHNSTON  2,223,913
OIL PRESSURE TESTER
Filed Sept. 4, 1937   3 Sheets-Sheet 3

Patented Dec. 3, 1940

2,223,913

UNITED STATES PATENT OFFICE 2,223,913

OIL PRESSURE TESTER

James Luther Johnston, Houston, Tex.

Application September 4, 1937, Serial No. 162,530

8 Claims. (Cl. 234—20)

This invention relates to pressure recorders, and more particularly to a device or apparatus for recording fluid pressures in oil or other wells.

Heretofore, in testing wells to determine the pressure of gas or liquid contained therein, it has been customary to employ a device having a record sheet which is rotated or moved by suitable mechanism, the mechanism giving a graph on the sheet. Such record sheets are not provided with a scale as to time intervals and pressure, thus necessitating the subsequent calibration of the instrument usually at a point removed from the scene of operation by persons familiar with the setting of the instrument, at great expense and consequent loss of valuable time. Moreover, by moving the record sheet considerable drag or strain is imposed on its operating mechanism or chronometer, therefore requiring a very costly chronometer.

The prime object of the present invention is to provide a testing device of the above stated character which will contain a record sheet having a calibrated scale as to pressure and the time of duration of the test, the device being constructed to make a graph on the record sheet so as to permit any person engaged in well testing to obtain a rapid and accurate reading of pressure and time thereof, as well as duration of test of any fluid pressure contained in the well without the need of subsequent calibration.

An important object of this invention is to provide a recorder of the above character which may be self contained or which may be readily adapted for use by itself or in connection and operation with other testers now on the market, as for example, with a device such as disclosed in my Patent No. 1,842,270.

A further object of the invention is to provide a tester of the above character wherein the chart or record sheet is supported in the device on a carrier which is insertable and removable from the outer casing of the the testing device thus facilitating the accurate disposition of the chart in the testing device.

A further object of the invention is a testing device of the above stated character wherein the record sheet remains stationary in the tester and the graph or record is made on the sheet by a movable stylus.

Another object of the invention is the provision of a recording mechanism in a well pressure testing device, wherein a record sheet is maintained stationary and a stylus is moved in two directions with respect to the sheet to give a graph, the stylus being moved in one direction by a timing mechanism and in the other direction by a pressure responsive mechanism.

Another object of the invention is the provision of a testing device of the above stated character having a recording mechanism, which comprises the record sheet and the stylus actuating mechanism removable from the device as a unit.

A still further object of the invention is the provision of a testing device of the above character having a novel construction with a minimum of operating parts and which is durable and comparatively inexpensive for the purposes thereof.

With the above and other objects in view the invention resides in the sundry details of construction, combination and arrangement of parts hereinafter more fully described and particularly pointed out in the appended claims.

In the drawings which show the preferred embodiment of the invention as at present devised, by way of example:

Figure 1 is a side elevation of the invention shown attached to the end of a formation tester and disposed in the "rat hole" of a well;

Figure 2 is a vertical longitudinal section of the pressure tester of the present invention, as shown in Figure 1, with only part of the recording mechanism shown in section;

Figure 3 is an enlarged fragmentary view of the tester shown in longitudinal section to illustrate the detail construction of the recording mechanism;

Figure 4 is a transverse sectional view taken substantially on line 4—4 of Figure 2;

Figure 5 is a vertical section of the stylus head and its relation with respect to the recording sheet or chart and taken substantially on line 5—5 of Figure 4;

Figure 6 is a bottom plan view of the stylus head;

Figure 8 is an enlarged fragmentary view of the upper portion of the chronometer casing and the recorder container showing the means for positioning the chronometer casing with respect to the recorder carrier.

Figure 7:
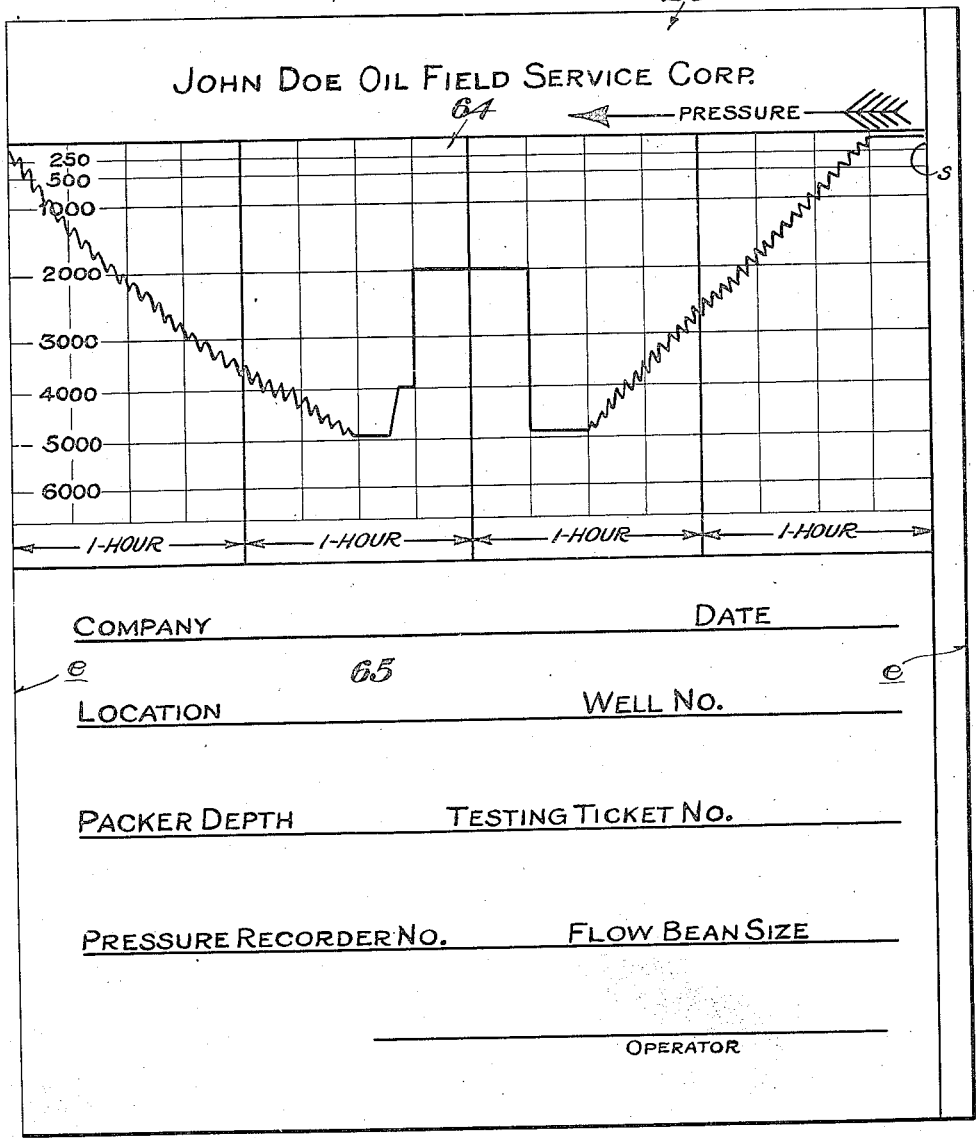
Figure 7 is a plan view of the chart or record sheet.

Referring in detail to the drawings in which like characters denote similar and like parts, T denotes the testing device of the present invention and this device, together with other similar testing devices, is commonly termed "bombs" in the practical art. This testing device is to be lowered into a well, indicated at 10 in Fig. 1, that has already been drilled or one in the process of being drilled, or, in other words, at any stage or condition of the well for the purpose of determining the "bottom hole" pressure of fluid, whether gas or liquid. The device may be used in connection with other testing devices such as a "formation tester" or the like, or may be independently used. When independently used it may be attached to a drill pipe, flow tubing or wire line or cable by which the testing device is lowered into the well to the depth desired. When used in connection with a drill pipe, a flow tubing or a formation testing device, a "packer" 11 may be employed in the usual manner. The packer, shown in Figure 1, is of the conical type used in connection with a "rat-hole" drilling as shown at 12. These packers are for the purpose of closing the hydrostatic head pressure of fluid in the well from the "bottom hole." When packers are not used, as when the device is suspended from a cable—for example, the well is closed at the top to cut off atmospheric pressure from the liquid in the well.

The purpose of taking the bottom hole pressure of a well is for determining the potential production of a well or for determining whether all of the wells on a given "sand" are of the same pressure.

The pressure tester of the present invention comprises an outer casing 13 which contains the recording mechanism R and a slidable rod 14. On the lower end of the outer casing 13 is connected a pressure actuated device P responsive to pressure within the well.

The pressure actuated device P, in the form in which it is at present devised, comprises a body member 15 which may be a connector element, commonly known in the art as "subs," threadedly attached to the lower end of the casing 13 and having a longitudinal passage 15a therethrough. To the lower end of the connector 15, and communicating with the passage therein, a liquid container 17 is suitably attached and has flexible or yieldable side walls which may be compressed when subjected to exterior pressure whereby the fluid therein will move into the passage 15a of the connector 15. The liquid container 17 may be, and preferably is, of a rubber bag or sack secured about the periphery of the lower edge of the passage 15a in the connector 15, the connector being provided with a threaded nipple 18 to facilitate this attachment and to receive the threaded end of a slotted protecting tube 19 surrounding the bag or bladder 17. A perforated bull plug 20 incloses the bladder 17 and the protector 19 and is removably threaded to the lower end of the connector 15.

Within the passage 15a, is a piston 16, of any suitable material which will have a fluid tight sliding fit with the walls of the passage; and further has a position rod 16a to normally extend beyond the connector 15 to engage the lower end of the connecting rod 14, which transmits the movement of the piston 16, caused by the fluid in the bag 17, to the recorder R.

The upper end of the casing 13 may be threaded in an end of a coupling 21 having a partition 22 for completely closing the upper end of the casing 13. The other end of the coupling may be attached, as above stated, to a cable, a drill pipe or flow tubing, or to another testing device such, for example, as a formation tester generally indicated at F in Figure 1, which would be disposed between the pressure testing device T and the packer 11.

The recorder R of the present device consists of a container or carrier 23 for the recording mechanism and a chronometer 25 and is preferably in the form of a cylinder conforming with the interior of the casing 13, in the upper end of which it may be inserted or from which removed as desired. The recorder is normally supported in position, preferably, by providing a flange or rib 23b on the upper end of the container 23 to rest upon a complemental shoulder 24 on the interior wall of the outer casing 13 and is retained in position by rotatable exteriorly threaded binding nut or collar 23a surrounding the upper end position of the carrier 23. The collar 23a is threadedly engageable with upper end of the casing 13 and bears against an annular rib 23b on the carrier 23 when the collar is in threadedly attached position on the casing. The chronometer 25 is removably supported and attached to the upper end of the carrier 23. A chart or recording sheet 26 is placed against the interior wall of the carrier cylinder 23 in cooperative relation with a stylus 27 depending from the chronometer 25. The casing 25a of the chronometer is inserted in the upper end of the carrier 23 and has an outwardly extending flange 28 which rests upon the upper edge of the carrier 23, there being a projection 29 on the latter which fits into a notch 30 in the flange so as to properly position the chronometer with respect to the carrier and the chart carried thereby. A cap 31 is threadedly secured to the upper end of the carrier 23, thereby maintaining the chronometer in place on the carrier 23 and excluding dirt therefrom. The driving arbor 32 of the chronometer has suspended from it, through the intermediary of a universal joint 33, a telescoping rod connection connected with a stylus head 34. This telescoping rod connection is constructed to be rotated by the chronometer to move the stylus 27 with respect to the stationary recording sheet 26 and may comprise a rod 35 telescoping with a tubular rod 36, the latter having a longitudinal slot 37 therein through which a pin 38 carried by the rod 35 extends. The rods 35 and 36 are maintained in their extended position by a spring 39 which, preferably, may surround the tube 36 and bear upon the head 34 with its other end bearing against the lower end of a jacketing tube 35a fast with the rod 35.

The stylus head 34 preferably comprises two disk members *a* and *b* (see Figures 3 and 5) of a diameter slightly less than that of the carrier 23, when the recording sheet 26 is in position, in order that it may have an approximately close cooperative relationship with record sheet 26 on the inner wall of the carrier 23 while, at the same time, permitting the head to have a free rotatable and reciprocating movement therein. For this purpose at least two ball bearings 41 are disposed between the disks *a* and *b* and spaced approximately 120° apart with respect to each other and with the stylus 27, the bearings being mounted in suitable sockets 42' secured to the disk *b*.

The disk *a* is attached to the rod 36 and the disc *b*, which supports the stylus 27 and antifriction members 41, is secured to the disk *a* by screws 42 and is spaced a suitable distance from the plate *a* by spacers 43 to provide a housing for the anti-frictional members 41 and a stylus pressure spring 44.

The stylus 27 consists of a pen-like member horizontally disposed on an edge portion of the disk b and has a slidable movement radially of the disk b in a retaining guide 45. The rear end of the stylus is provided with a well 46, which may be formed from the material of the stylus 27, and its upper surface is trough-like which gradually diminishes to the point thereof. Ink may be placed in the well 46 and fed by capillary attraction to the trough surface of the stylus and, thence, to its point by a wick 47 of any suitable material such, for instance, as a wire rod having a portion bent upon itself to conform with the shape of the well 46 and one end lying in the trough portion of the stylus while its other end extends outwardly beyond the well forming a latch 48 for the stylus pressure spring 44, as can be clearly seen in Figure 5. The disk b has an opening 49 therein through which the well 46 extends, the well forming a finger piece by which the stylus may be manipulated when occasion requires. The spring 44 is a flat spring having one end secured to the plate b and its other end positioned in back of the stylus so as to exert a pressure thereon for moving the stylus radially outwardly of the head 34, the end of the spring engaging under the latch 48, formed by the wick, to prevent it from accidentally moving out of position. The stylus may be held in its inoperative position by moving the latter radially inwardly and maintaining it in that position by a suitable spring latch 50 (see Fig. 6), which may consist of a strand of wire having one end securely fastened to the bottom face of the disc b and its other end bent to form a finger-piece 51 having a projection 53 thereon to enter either, as may be desired, into a notch 52 or an opening 54, both in the plate b. When the projection 53 is engaged in the opening 54, an intermediate portion of the spring 50 will engage the reservoir 46 of the stylus and move the same radially inwardly retracting it from its co-operative position with the recording sheet 26. The notch 52 is to receive the projection 53 and to hold the spring 50 in inoperative position, when it is desired to have the stylus in operative or its radially outward position. By disposing the spring 50 on the bottom of the plate b, the stylus 27 may be withdrawn from operative position, when the carrier 23 is moved from the outer casing 13, without the necessity of disassembling the chronometer and withdrawing the stylus head from the carrier tube 23.

It has been seen that the chronometer will rotate the stylus head with respect to the chart and that the stylus will record a marking on the latter. The stylus head 34 also may be reciprocated longitudinally of the carrier 23, and therefore of the chart 26, and this movement is effected from the pressure actuated device P through the medium of a connecting rod 14 receiving its motion from the piston 16 in the connector 15. The connecting rod 14 extends through a sleeve 55 threadedly supported on a nippled end of the connector 15. The sleeve 55 has opposed longitudinal slots 56 therein and is surrounded by a helical spring 57 for the purpose of weighing the pressure exerted on the piston 16 and which is transmitted to the stylus head 34. Therefore, it is of necessity that the spring 57 be nicely selected and calibrated with the scale of the chart or recording sheet 26. The spring 57 is disposed between adjustable nuts 58 on the upper end of the sleeve 55 and a collar 59, also loosely surrounding the sleeve 55, which collar bears upon a cross head 60 removably inserted in a slot in the lower end of the connecting rod 14 and extending through the slots 56 in the sleeve 55. By adjustment of the nuts 58 proper tension on the spring 57 may be maintained or the stylus 27 may be adjusted to zero position on the recording sheet or chart 26.

The upper end of the connecting rod 14 is provided with a socket 61 containing an antifrictional ball bearing 62 which will contact the plate b of the stylus head 34 for moving the stylus longitudinally of the chart carrier 23, it being understood that when pressure is relieved the spring 57 returns the connecting rod 14 to its lower position and the spring 39 will move the stylus head 34 likewise.

The recording sheet or chart 26 is shown in Figure 7 and consists of a blank piece of paper or the like containing a scale 64 and blanks or spaces 65 for other identifying indicia. The chart 26 is of such size that, when it is bent in cylindrical form and inserted into the bottom end of the carrier 23 to lie against the side walls of the same, its side edges e meet, or substantially so, and a resilient split ring 63 maintains it in position. The chart is inserted in the bottom end of the tube with its lower end first, that is—upside down. With this arrangement, the lower pressures are at the top of the chart when the chart is withdrawn from the carrier to be read and, for this purpose, the chronometer moves the stylus head 34 in clockwise direction. The scale 64 of the chart consists of a calibrated area divided-off by vertical lines to represent time intervals, the heavy vertical lines denoting hour intervals and the finer lines, fifteen minute intervals. The scale area is further divided-off by horizontal lines which indicate "pound pressure" and these horizontal divisions are co-related with the action of the weighing spring 57. Thus, when a test has been run and the chart 26 has been removed, a complete graph of the well pressure, at stated intervals of time, is contained on the chart without the necessity of further calculations, and may be read by unskilled workmen or operators at the point where the test is made.

In practice, at the present time, when inserting the chart into the carrier 23 the position of the stylus 27, with respect to the side wall of the carrier 23 is ascertained and a temporary mark, with a suitable pencil, is made on the lower edge of the carrier. The chart is then inserted so that the starting edge s thereof will align with the marking. The chronometer 25 carrying the stylus is then inserted in the carrier 23 and secured thereon by placing the cap 31 in position, then placing the carrier in the upper end of the outer casing 13, then securing the casing 13 and its appended parts to a coupling 21 and lowering the device in the well. When the chart is inserted in the carrier 23 note is taken of the time consumed from that point until the testing device is properly positioned in the well and, in reading the chart, proper time allowance will be deducted from the resulting graph on the chart in reading the pressures obtained thereon while in the well.

From the above it will be manifest that a very simple, effective and accurate pressure testing device has been devised which will produce a chart containing a graph that can be read, at the point the test is made, by unskilled persons, thus saving much time and labor in testing operations which may be many miles from the office or headquarters; that the operating mechanism is very simple and such as will not readily get out of order or break, employing a reduced number of parts; that there is no strain or drag on the chronometer mechanism since anti-frictional members are provided at all points of contact between the stylus head and other parts, thus permitting a rather inexpensive chronometer mechanism to be employed; that the recorder mechanism may be removed as a unit from the body of the tester, thus facilitating the ease and celerity with which the record sheet or chart may be inserted in and removed from the testing device; that the stylus may be rendered operative and inoperative without the necessity of removing the stylus head from its relation with respect to the chart; and that the pressure testing device may be used separately or in combination with other testing devices.

Having thus described the invention and the manner in which it is to be performed, it is to be understood that the invention is not to be limited to the details of construction herein described as the same may be modified and varied in numerous ways which fall within the scope of the appended claims.

That which is claimed is:

1. A pressure testing device for wells comprising an outer casing having a pressure responsive device therein; and a recorder removably inserted as a unit in said casing and including a container adapted to receive a stationary record chart therein, a marking instrument in the container and associated with said chart and mounted for reciprocating and rotary movement thereover and timing means carried by the container for rotating the instrument; said instrument being arranged to be reciprocably actuated by the pressure responsive means during the rotary movement thereof whereby to obtain a horizontal and vertical record on the chart of the movement of the last named means, said marking instrument including a stylus positioned thereon adjacent the inner wall of the container for marking said chart, said stylus being slidably mounted on the instrument radially thereof, biasing means for urging said stylus radially outwardly, and manually operable means accessible from the bottom of said container for rendering the stylus operative and inoperative.

2. In a recorder, a container adapted to receive a record chart, timing mechanism in the upper end of the container and having a universally mounted member depending axially therefrom, a second member telescopically mounted on the first named member, a stylus mounted on the free end of the second member and in cooperative relation with said chart and rotatably driven through said members by said timing mechanism whereby a time measured graph may be made on the chart.

3. In a recorder including a container adapted to receive therein a record chart, the combination of a timing mechanism in the upper end of the container, a stylus head depending and driven from said mechanism and in cooperative relation with said chart, said head comprising a disk, anti-friction bearings on said disk and adjacent the periphery of the latter for engaging said chart, a spring projected stylus carried by the head and engaging said chart.

4. A stylus head for cooperation with a circularly disposed chart, comprising a rotatable disk-like member to contact with and to be guided by the surface of the chart, a stylus carried by the head and having the point thereof positioned at the peripheral portion of the disk-like member to cooperate with the chart as the head is rotated, said stylus being movable on said head to and from operative position, a substantially radial slot in said head, an ink retaining well on said stylus and projecting through said slot and forming a finger piece whereby the stylus may be moved in and out of operative position.

5. A pressure recorder including a casing adapted to receive therein a record chart adjacent the upper end thereof, a timing mechanism in the upper end of the casing and having a universally mounted member depending axially therefrom, a second member telescopically mounted on the first named member, a stylus head mounted on the free end of the second member and comprising a pair of horizontally disposed vertically spaced disks, anti-friction bearings supported between said disks adjacent the periphery of the latter and engaging said chart, a spring projected stylus carried by the head between said disks and engaging said chart, a spring retracted rod having an anti-friction bearing mounted upon its upper free end and engaging said head, and fluid pressure means on the casing and adapted to reciprocate said rod against the tension of its spring during the rotation of the head by the timing mechanism, whereby to obtain a vertical and horizontal record upon the chart of the movement of said rod.

6. In a stylus head for a pressure recorder which includes a cylindrical container adapted to carry a circularly disposed chart therein and having an open end, said stylus head being adapted to be disposed in the open end portion of said container and comprising a rotatable disk-like member, the combination of a stylus carried at the peripheral portion of said head for contacting the chart, means on said head permitting the stylus to be moved into and from operative relation with the chart, and means for retaining the stylus in its inoperative position, both of said last mentioned means being accessible through the open end of said container when said head is assembled therein.

7. In a stylus head for a recorder which includes a cylindrical container adapted to have a chart disposed against the inner wall thereof and having an open end, said stylus head being adapted to be disposed in the container adjacent its open end and comprising a rotatable disk-like member, the combination of anti-frictional means on the periphery of the head for engagement with the chart for centering said member in the container and to move thereover, a stylus carried at the peripheral portion of said head for contacting the chart, means on said head permitting the stylus to be moved into and from operative relation with the chart, and means for retaining the stylus in its inoperative position, both of said last mentioned means being accessible through the open end of said container when said head is assembled therein.

8. In a well testing device, a container adapted to receive therein a chart, a timing mechanism in one end portion of the container, a stylus head reciprocable in said container and supported by and rotated from the timing mechanism in cooperative relation with the chart, means functioning to project said head from said timing mechanism, means limiting the separation of the head from the timing mechanism, a stylus carried by said head for engagement with the chart, a spring retracted rod having a bearing surface at one end for abutting said head through the end of the container opposite said timing mechanism, and a fluid pressure actuator mechanism adapted to move said rod in opposition to its spring during the rotation of said timing mechanism, whereby the stylus will record a graph on the chart of the movement of said rod.

JAMES LUTHER JOHNSTON.